(12) United States Patent
Anglin et al.

(10) Patent No.: US 10,552,547 B2
(45) Date of Patent: Feb. 4, 2020

(54) REAL-TIME TRANSLATION EVALUATION SERVICES FOR INTEGRATED DEVELOPMENT ENVIRONMENTS

(71) Applicant: International Business Machines Corporation, Armonk, NY (US)

(72) Inventors: Debbie Anglin, Williamson, TX (US); Su Liu, Austin, TX (US); Boyi Tzen, Taipei (TW); Fan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/729,001

(22) Filed: Oct. 10, 2017

(65) Prior Publication Data

US 2019/0108222 A1    Apr. 11, 2019

(51) Int. Cl.
   *G06F 17/28*    (2006.01)
   *G06N 5/04*     (2006.01)
   (Continued)

(52) U.S. Cl.
   CPC .......... *G06F 17/289* (2013.01); *G06N 5/043* (2013.01); *G06N 7/00* (2013.01); *G06N 20/00* (2019.01)

(58) Field of Classification Search
   CPC ............... G06F 17/289; G06F 17/2836; G06F 17/2854; G06F 17/2827; G06F 17/2818;
   (Continued)

(56) References Cited

U.S. PATENT DOCUMENTS

| 6,233,544 B1* | 5/2001 | Alshawi .............. G06F 17/2818 704/2 |
| 6,345,244 B1* | 2/2002 | Clark .................. G06F 17/2836 704/2 |

(Continued)

FOREIGN PATENT DOCUMENTS

WO    2015063536 A1    5/2015

OTHER PUBLICATIONS

Anonymous; "IBM Globalization—Tips for Writing for an International Audience"; https://www-01.ibm.com/software/globalization/topics/writing/style.html; printed from the World Wide Web on Oct. 3, 2017; 2 pages.

(Continued)

*Primary Examiner* — Abdelali Serrou
(74) *Attorney, Agent, or Firm* — Cantor Colburn LLP; Joseph Petrokaitis

(57) ABSTRACT

Embodiments of the present invention provide a computer-implemented method of real-time translation evaluation service. A plurality of text translations are received for an input text from a plurality of different machine translation servers. A similarity analyzer is executed that generates a first similarity score for each given text translation of the plurality of text translations by comparing the given text translation with others of the plurality of text translations. A translation evaluator is executed that generates a second similarity score for each given text translation by comparing similarity of the given text translation with a plurality of comparison factors that include company word/term usage guidelines and product translation consistency rules. A best translation is identified and transmitted to an integrated development environment. The identification being based at least in part on the first similarity scores and the second similarity scores.

17 Claims, 6 Drawing Sheets

(51) Int. Cl.
*G06N 7/00* (2006.01)
*G06N 20/00* (2019.01)

(58) Field of Classification Search
CPC .. G06F 17/2247; G06F 9/454; G06F 17/2705; G06F 16/95; G06F 17/28; G06F 17/2735; G06F 17/275; G06F 17/2872; G06F 16/951; G06F 17/274; G06F 17/2785; G06F 17/2795; G06F 17/2809; G06F 17/2845; G06F 17/212; G06F 17/2223; G06F 17/2863; G06F 8/38; G06F 11/362; G06F 11/3664; G06F 11/3668; G06F 16/2291; G06F 16/24575; G06F 16/284; G06F 16/3337; G06F 16/335; G06F 16/90332; G06F 16/93; G06F 17/2205; G06F 17/2211; G06F 17/2264; G06F 17/24; G06F 17/248; G06F 17/271; G06F 17/2715; G06F 17/273; G06F 17/2755; G06F 17/2765; G06F 17/277; G06F 17/279; G06F 19/3418; G06F 3/018; G06F 3/0481; G06F 3/04883; G06F 9/44505; G06F 17/2288; G06F 21/31; G06F 21/6218; G06F 2221/2101; G06F 8/31; G06F 16/248; G06F 16/285; G06F 16/9537; G06F 16/9558; G06F 16/9566; G06F 16/957; G06F 16/958; G06F 16/972; G06F 17/211; G06F 17/218; G06F 17/2775; G06F 21/62; G06F 21/6209; G06F 2211/003; G06F 2211/009; G06F 3/04842; G06F 8/41; G06F 8/71; G06F 2209/501; G06F 8/70; G06F 8/75; G06F 9/5027; G06F 9/5088; G06F 5/043; G06F 7/00; G06F 20/00
See application file for complete search history.

(56) References Cited

U.S. PATENT DOCUMENTS

| | | | | |
|---|---|---|---|---|
| 7,552,452 | B2* | 6/2009 | McHugh | G06F 17/212 704/1 |
| 8,185,373 | B1* | 5/2012 | Messenger | G06F 17/2854 704/2 |
| 8,768,687 | B1 | 7/2014 | Quasthoff et al. | |
| 8,886,515 | B2* | 11/2014 | Van Assche | G06F 17/2836 704/10 |
| 8,972,432 | B2 | 3/2015 | Shaw et al. | |
| 8,990,064 | B2* | 3/2015 | Marcu | G06F 17/289 704/10 |
| 9,026,425 | B2 | 5/2015 | Nikoulina et al. | |
| 9,122,674 | B1 | 9/2015 | Wong et al. | |
| 9,141,606 | B2 | 9/2015 | Marciano et al. | |
| 9,152,622 | B2 | 10/2015 | Marcu et al. | |
| 9,256,597 | B2 | 2/2016 | Li et al. | |
| 9,262,403 | B2* | 2/2016 | Christ | G06F 17/276 |
| 9,575,965 | B2* | 2/2017 | Ranjan | G06F 17/2854 |
| 10,255,277 | B2* | 4/2019 | Zhang | G06F 17/2854 |
| 2002/0165708 | A1* | 11/2002 | Kumhyr | G06F 17/2765 704/8 |
| 2003/0115552 | A1* | 6/2003 | Jahnke | G06F 9/454 715/201 |
| 2004/0260532 | A1 | 12/2004 | Richardson et al. | |
| 2005/0267738 | A1* | 12/2005 | Wilkinson | G06F 17/275 704/9 |
| 2006/0106593 | A1 | 5/2006 | Schultz et al. | |
| 2008/0270112 | A1* | 10/2008 | Shimohata | G06F 17/289 704/3 |
| 2009/0070099 | A1* | 3/2009 | Anisimovich | G06F 17/2755 704/5 |
| 2009/0157386 | A1* | 6/2009 | Zhou | G06F 17/28 704/9 |
| 2009/0175545 | A1* | 7/2009 | Cancedda | G06K 9/627 382/229 |
| 2009/0234635 | A1* | 9/2009 | Bhatt | G06F 17/289 704/2 |
| 2010/0179803 | A1 | 7/2010 | Sawaf et al. | |
| 2011/0307495 | A1* | 12/2011 | Shoshan | G06F 17/2854 707/748 |
| 2012/0330990 | A1* | 12/2012 | Chen | G06F 17/28 707/761 |
| 2013/0007588 | A1 | 1/2013 | Guo et al. | |
| 2014/0249797 | A1* | 9/2014 | Liu | G06F 17/2288 704/2 |
| 2014/0249798 | A1* | 9/2014 | Sun | G06K 9/26 704/3 |
| 2014/0358519 | A1* | 12/2014 | Mirkin | G06F 17/2854 704/3 |
| 2014/0358524 | A1 | 12/2014 | Papula et al. | |
| 2015/0120273 | A1 | 4/2015 | Gusakov et al. | |
| 2015/0161112 | A1* | 6/2015 | Galvez | G06F 16/258 704/7 |
| 2016/0147742 | A1* | 5/2016 | Park | G06F 16/5846 715/703 |
| 2016/0162478 | A1 | 6/2016 | Blassin et al. | |
| 2016/0188576 | A1 | 6/2016 | Huang | |
| 2017/0048340 | A1* | 2/2017 | Zhang | G06F 17/2854 |
| 2017/0357639 | A1* | 12/2017 | Zamor | G06F 17/289 |
| 2017/0371869 | A1* | 12/2017 | Zhang | G06F 17/2854 |
| 2018/0011843 | A1* | 1/2018 | Lee | G06F 17/2854 |

OTHER PUBLICATIONS

Anonymous; 2009 NIST Open Machine Translation Evaluation Plan; Information Technology Laboratory—www.nist.gov/itl; printed from the World Wide Web Oct. 3, 2017; 4 pages.
Blatz et al.; "Cofidence Estimation for Machine Translation"; Mar. 29, 2004; 113 pages.
Derespinis et al.; "The IBM Style Guide—Conventions for Writers and Editors"; IBM Press, Pearson PLC; Oct. 2011; 44 pages.
Mell et al.; "The NIST Definition of Cloud Computing—Recommendations of the National Institute of Standards and Technology"; U.S. Department of Commerce; Sep. 2011; 7 pages.
Surcin et al.; "Evaluation of Machine Translation with Predictive Metrics beyond BLEU/NIST: CESTA Evaluation Campaign #1"; Research Gate https://www.researchgate.net/publication/228703886; printed form the World Wide Web Oct. 3, 2017; 9 pages.

* cited by examiner

REAL-TIME TRANSLATION EVALUATION SERVICES FOR INTEGRATED DEVELOPMENT ENVIRONMENTS

BACKGROUND

The present invention generally relates to machine language translations of text, and more specifically, to real-time translation evaluation services for integrated development environments.

Computer-based globalization features are an important part of processing national data. Machine translation services have been used in online translation services on server-side implementations to off-load computational tasks from client devices. Many machine translation services are static and rules-based, thus often requiring machine translation requestor to provide a translation domain and rule set to maintain a minimum accuracy and correctness for translations.

SUMMARY

Embodiments of the present invention provide a computer-implemented method of real-time translation evaluation service. A non-limiting example of the computer-implemented method includes receiving a plurality of text translations for an input text, in which the input text is in a first language and the plurality of text translations are in a second language, and in which each of the plurality of text translations is generated by a different machine translation server of a plurality of machine translation servers. The method includes executing a similarity analyzer that is configured to generate a first similarity score for each given text translation of the plurality of text translations by comparing the given text translation with others of the plurality of text translations. The method includes executing a translation evaluator that is configured to generate a second similarity score for each given text translation by comparing the similarity of the given text translation with a plurality of comparison factors. The translation evaluator is further configured to identify the best translation based at least in part on the first similarity scores and the second similarity scores. The comparison factors include company word/term usage guidelines and product translation consistency rules. The method includes transmitting the best translation to an integrated development environment.

Embodiments of the present invention provide a computer program product for real-time translation evaluation service, the computer program product comprising a computer readable storage medium having program instructions embodied therewith. The program instructions are executable by a system operatively coupled to one or more processors to cause the system to perform a method. A non-limiting example of the method includes receiving a plurality of text translations for an input text, in which the input text is in a first language and the plurality of text translations are in a second language, and in which each of the plurality of text translations is generated by a different machine translation server of a plurality of machine translation servers. The method includes executing a similarity analyzer that is configured to generate a first similarity score for each given text translation of the plurality of text translations by comparing the given text translation with others of the plurality of text translations. The method includes executing a translation evaluator that is configured to generate a second similarity score for each given text translation by comparing the similarity of the given text translation with a plurality of comparison factors. The translation evaluator is further configured to identify the best translation based at least in part on the first similarity scores and the second similarity scores. The comparison factors include company word/term usage guidelines and product translation consistency rules. The method includes transmitting the best translation to an integrated development environment.

Embodiments of the present invention provide a system for real-time translation evaluation service. The system includes one or more processors configured to perform a method. A non-limiting example of the method includes receiving a plurality of text translations for an input text, in which the input text is in a first language and the plurality of text translations are in a second language, and in which each of the plurality of text translations is generated by a different machine translation server of a plurality of machine translation servers. The method includes executing a similarity analyzer that is configured to generate a first similarity score for each given text translation of the plurality of text translations by comparing the given text translation with others of the plurality of text translations The method includes executing a translation evaluator that is configured to generate a second similarity score for each given text translation by comparing similarity of the given text translation with a plurality of comparison factors. The translation evaluator is further configured to identify the best translation based at least in part on the first similarity scores and the second similarity scores. The comparison factors include company word/term usage guidelines and product translation consistency rules. The method includes transmitting the best translation to an integrated development environment.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
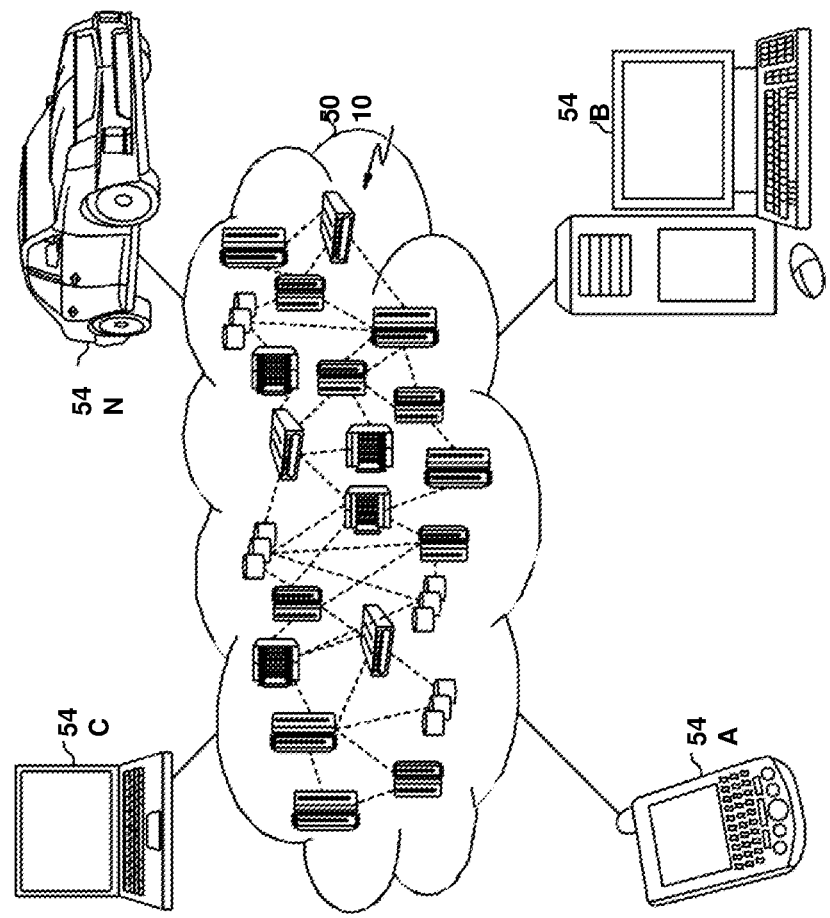
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
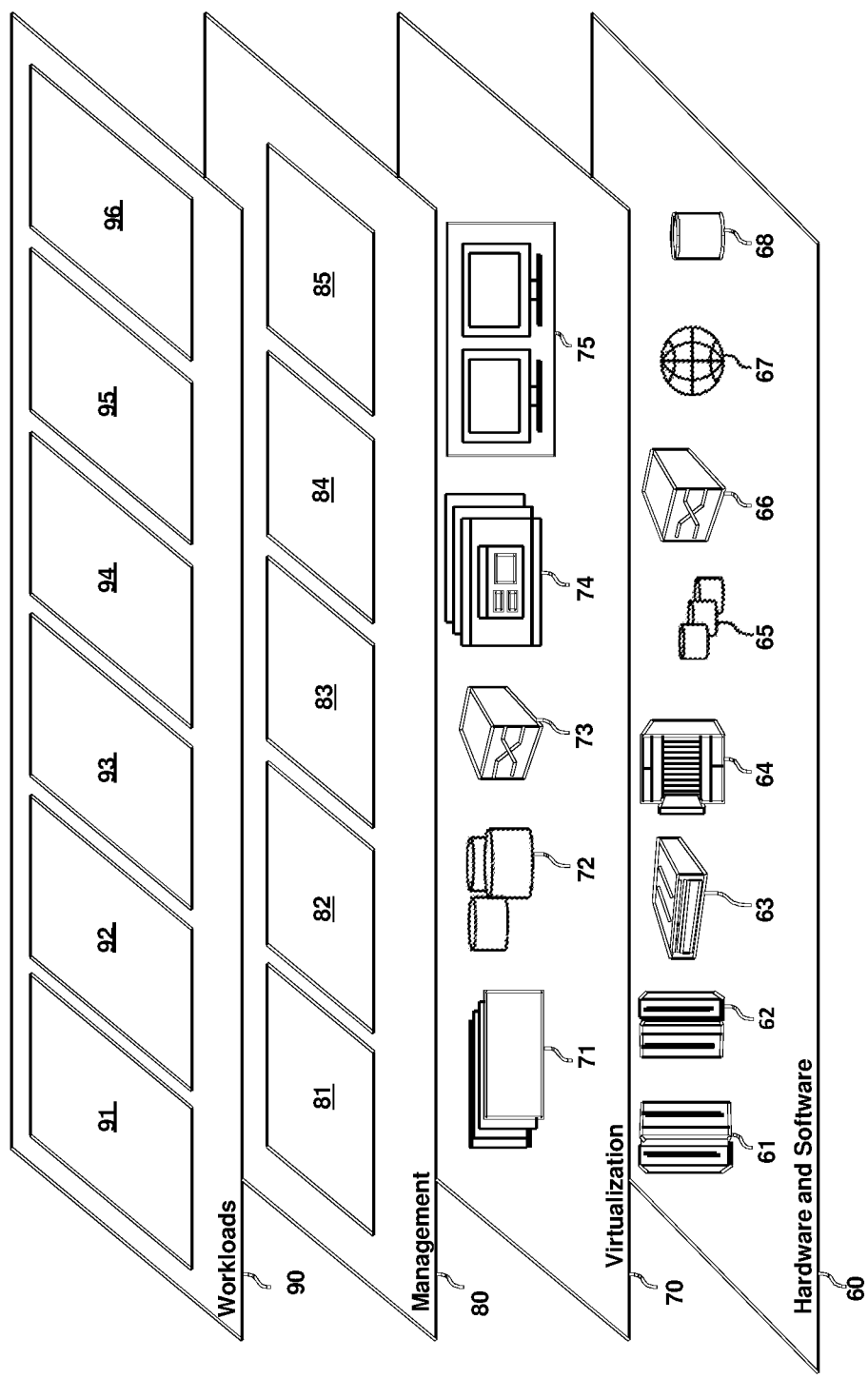
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and real-time translation evaluation service processing 96.

Turning now to an overview of technologies that are more specifically relevant to aspects of the invention, machine translation is a tool that can be used to translate information content from a first language to a second language. Cloud-based machine translation is sometimes utilized in modern mobile device environments, which allows for the offloading of computational tasks that are normally performed at client-side devices. Some machine translations are static and rules-based, thus requiring translation requestors to provide static translation domain and rules, which provide a minimum level of accuracy and correctness. Machine translation service is useful for personal translation applications, but it has been difficult to use directly as part of a globalization service as the accuracy of machine translations excessively fluctuate and lead to inefficient data processing and wasting of computation resources. For enterprise level translation, professional translators are often required to evaluate each and every translated message. A typical translation evaluation is based on interactive human-machine translation processing. For example, some procedures utilize a human evaluator to provide a modification and/or verification of each translated message.

The process identified above can be prone to several technical issues. For example, computational resources are used inefficiently and translations are prone to errors because of human evaluation and verification. Selected best translations are often unsuitable as the translations are based on static domain-specific rules that are unable to evolve over time.

Turning now to an overview of the aspects of the invention, one or more embodiments of the invention address the above-described shortcomings of the prior art by providing a method of real-time translation evaluation service that can be integrated with multiple machine translation channels and cognitive translation knowledge management, in which the real-time translation evaluation service is able to dynamically assist translators in choosing the best translation via an integrated development environment. In some embodiments of the present invention, the best translation is identified based at least in part on application of word/term usage guidelines and/or consistency rules via cognitive learning. The method can simultaneously send a source message to a multiple machine translation service and then receive the best-translated message based on a real-time translation evaluation that is provided by the service. In some embodiments of the present invention, the best-translated message is received with a digitized confidence score and/or ranking.

Figure 3:
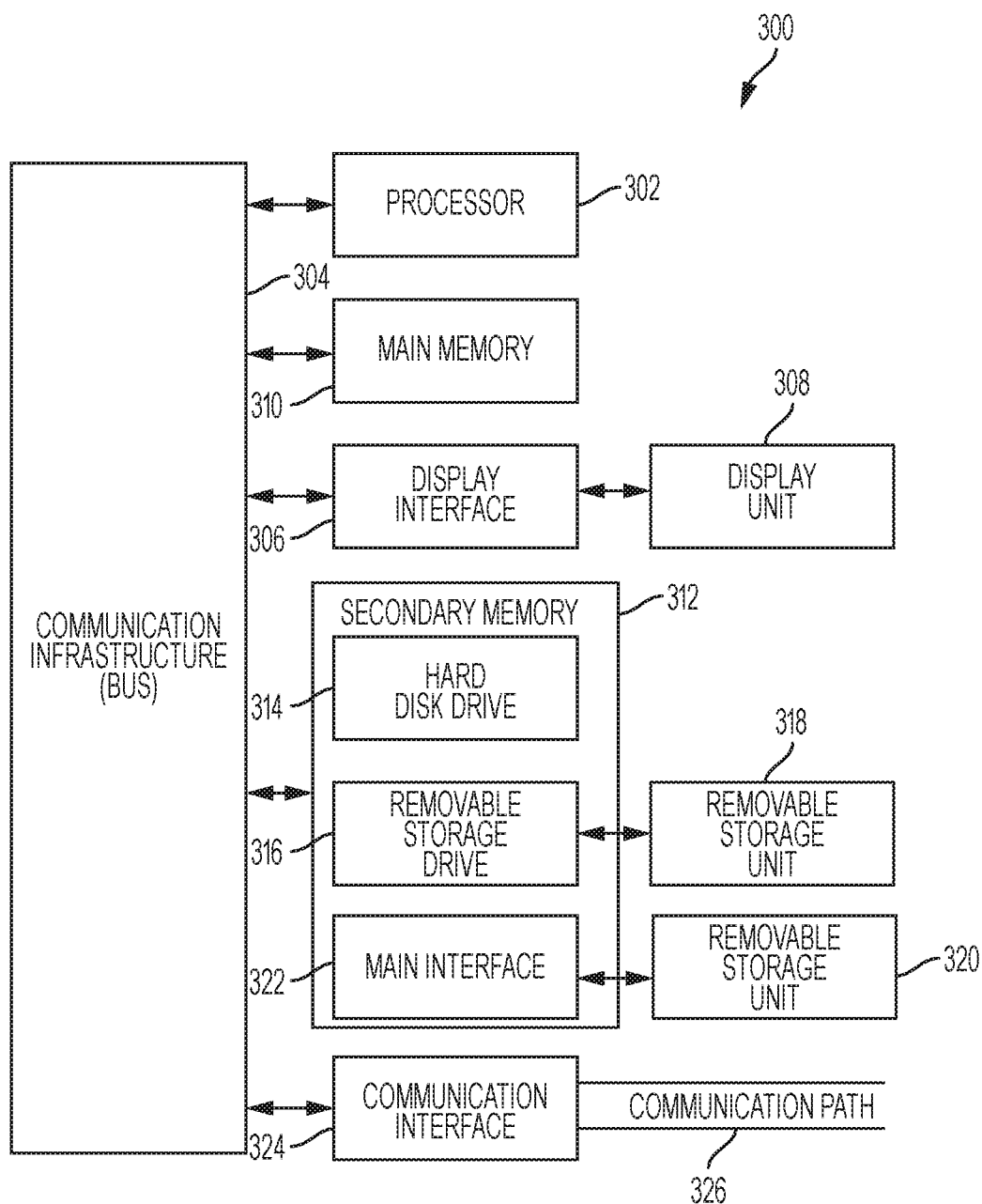
FIG. 3 depicts an exemplary computer system capable of implementing one or more embodiments of the present invention.

Turning now to a more detailed description of the present disclosure, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network (s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 that allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
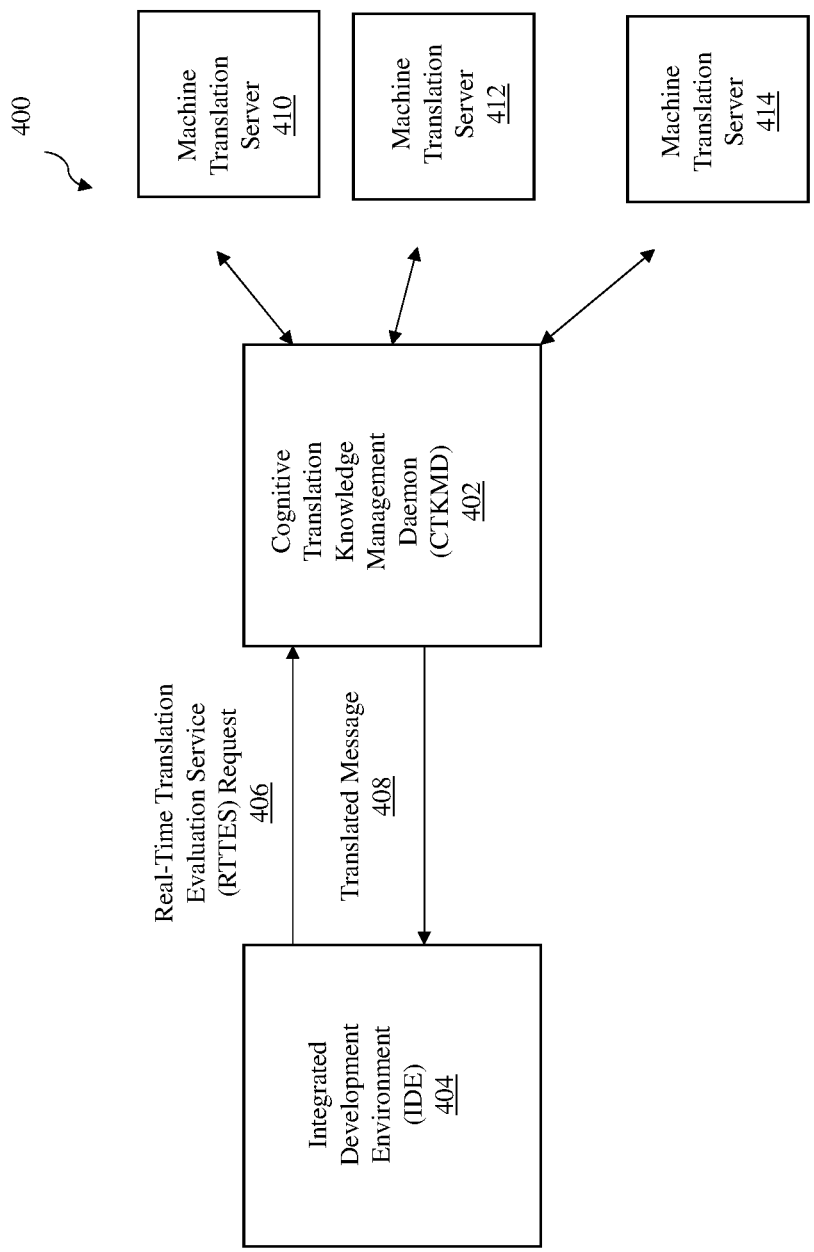
FIG. 4 depicts a block diagram of an example system for providing a real-time translation evaluation service in accordance with one or more embodiments of the present invention.

FIG. 4 illustrates a block diagram of an example system 400 for providing a real-time translation evaluation service in accordance with one or more embodiments of the present invention. In the embodiment shown in FIG. 4, the example system 400 includes a cognitive translation knowledge management daemon (CTKMD) 402 and an integrated development environment (IDE) 404, in which the (CTKMD) 402 is configured to be in communication with a plurality of machine translation servers 410, 412, 414. The plurality of machine translation servers 410, 412, 414 can comprise two or more machine translation servers or algorithms that are housed in or executed by one or more computer systems. The CTKMD 402 includes an application, module, or system for dynamically evaluating and purifying machine translated messages. The CTKMD 402 is configured to receive a real-time translation evaluation service (RTTES) request 406 from the IDE 404, in which the RTTES request 406 includes an input text in a first language. The CTKMD 402 is configured to transmit the input text to the plurality of machine translation servers 410, 412, 414 for translation into a second language. The CTKMD 402 is further configured to receive a plurality of text translations from the plurality of machine translation servers 410, 412, 414, to identify a translation of the plurality of translations as a potential best translation candidate, and to transmit the identified translated message 408 to the IDE 404.

Figure 5:
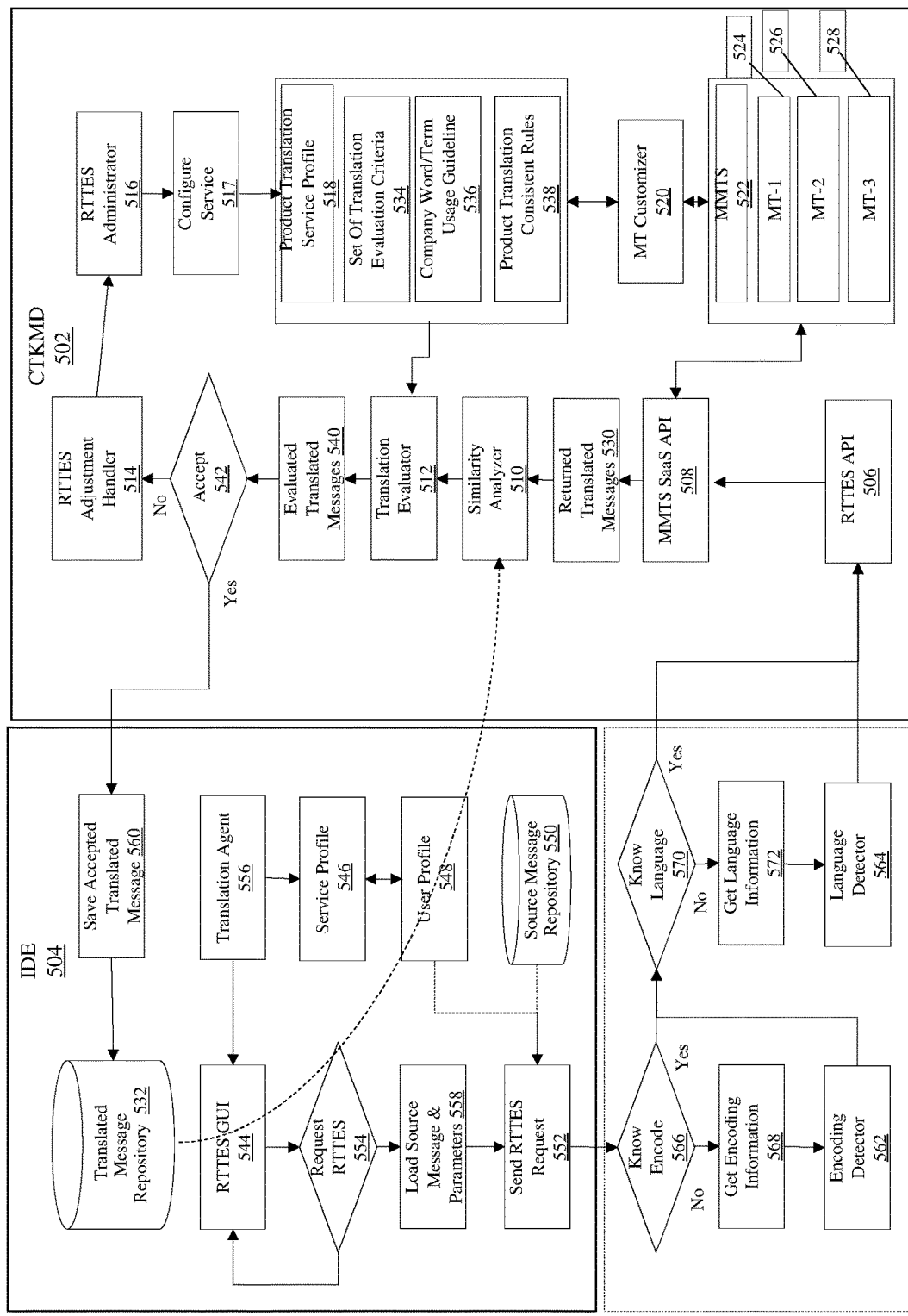
FIG. 5 depicts a block diagram of another example system and corresponding component flow for providing a real-time translation evaluation service in accordance with one or more embodiments of the present invention.

FIG. 5 illustrates a block diagram showing an example system 500 and corresponding component flow for providing a real-time translation evaluation service in accordance with the one or more embodiments of the present invention. System 500 includes a CTKMD 502 and an IDE 504, in which the CTKMD 502 includes an RTTES API 506, a MMTS SaaS API 508, a similarity analyzer 510, a translation evaluator 512, an RTTES adjustment handler 514, an RTTES administrator 516, a product translation service profile 518, a machine translation customizer 520, and a multiple machine translation server (MMTS) 522.

The RTTES API 506 includes an application, module, or system that provides a SaaS style service. In some embodiments of the present invention, the RTTES API 506 is utilized to receive a primary message package from IDE 504 that includes an input text and related parameters. The RTTES API 506 is used by the IDE 504 to communicate with the CTKMD 502 to request machine translation of the input text into in one or more different languages. The MMTS SaaS API 508 includes an application, module, or system for providing a SaaS style multiple machine translation service. In some embodiments of the present invention, the CTKMD 502 is configured to utilize the MMTS SaaS API 508 to process the primary message package that includes an input text in a first language and related parameters from the IDE 504, and then to send the input text and related parameter inputs to a plurality of machine translation servers via the MMTS server 522 for translation into a second language. The CTKMD 502 then receives at least one machine translated (MT) message 524, 526, 528 in the second language from each of the plurality of machine translations servers (e.g., machine translation server 410, 412, 414).

The multiple machine translation server (MMTS) 522 of CTKMD 502 is configured to be connected to a plurality of machine translation servers (e.g., machine translation server 410, 412, 414) for integrating multiple machine translation (MT) channels into a MT service. The machine translation customizer 520 includes an application, module, or system for customizing MT settings based on evaluation scores and updated service profiles. The machine-translated messages 524, 526, 528 that are obtained from the plurality of machine translation servers (e.g., machine translation server 410, 412, 414) are returned to the similarity analyzer 510 at 530.

The similarity analyzer 510 includes an application, module, or system for comparing similarity or dissimilarity between the returned translated messages 530 (e.g., machine translated messages 524, 526, 528). In some embodiments of the present invention, the similarity analyzer 510 is configured to generate a first similarity score for each given text translation of the plurality of text translations 524, 526, 528 by comparing the given text translation with others of the plurality of text translations 524, 526, 528. In some embodiments of the present invention, the similarity analyzer 510 is further or alternatively configured to generate the first similarity score by comparing, the similarity or dissimilarity between the given text translation and one or more previously accepted translated messages. In some embodiments of the present invention, the CTKMD 502 is configured to retrieve the one or more previously accepted translated messages from a translated message repository 532. In some embodiments of the present invention, the translated message repository 532 is housed within the IDE 504. In some embodiments of the present invention, the translated message repository 532 is external to both the IDE 504 and CTKMD 502 (not shown).

The translation evaluator 512 includes an application, module, or system for evaluating the returned translated message 530 (e.g., machine translated messages 524, 526, 528) according to criteria and values that are found in the product translation service profile 518. In some embodiments of the present invention, the translation evaluator 512 is configured to generate a second similarity score for each given text translation by comparing similarity of the given text translation with a plurality of comparison factors, and to identify a best translation based at least in part on the first similarity scores and the second similarity scores.

In some embodiments of the present invention, the plurality of comparison factors includes company word and/or term usage guidelines (CWTUG). In some embodiments of the present invention, the plurality of comparison factors includes product translation consistency rules (PTCR). In some embodiments of the present invention, the plurality of comparison factors includes one or more CWTUGs and one or more PTCRs. The CWTUGs are company guidelines and/or policies that indicate how the company wishes to use certain words and/or terms (e.g., terminology, glossary) for avoiding unnecessary user experience issues. For example, one usage guideline may prefer to leave the words "iPhone" and "iTunes" untranslated. PTCRs are sets of rules that are used by companies to establish that a same product has to use same and consistent translation rules for the same product. For example, a PTCR may establish that the English word "file" is to be translated or transliterated to Japanese using the same Japanese translation as defined by the PTCR for a given product. For the word "cancel," which has multiple correct translations in the Japanese language that depends on context, an example PTCR may establish which version of the Japanese translation "cancel" is to be used. In some embodiments of the present invention, the second similarity score of each given text translation further or alternatively generated by comparing, by the system, the given text translation with a plurality of user-defined customization rules (e.g., user profile 548 of FIG. 5).

In some embodiments of the present invention, the product translation service profile 518 includes a CWTUG 534, a PTCR 536, and/or a set of translation evaluation criteria 538 (e.g. the plurality of plurality of comparison factors) that are used for evaluating a given translated message. In some embodiments of the present invention, the set of translation evaluation criteria include weighted factors that are based at least in part on the CWTUG 534 and the PTCR 536. In some embodiments of the present invention, the set of translation evaluation criteria further or alternatively includes rules regarding returned message comparisons, predefined buffer size, and/or similarity requirements to existing translated data in the product. For example, a machine translation voting rule may be used in which a first, second and third translation is receives from a first, second, and third machine translation service respectively, A=B!=C, then A and B will have a higher evaluation score. In some embodiments of the present invention, each factor of the set of factors may be weighted based on one or more weight coefficients that can be adjusted by the RTTES adjustment handler 514 as needed.

In some embodiments of the present invention, after the translation evaluator 512 evaluates each of the returned translated messages 530, the translation evaluator 512 then outputs the evaluated translated messages 540 and identifies at 542 whether or not one of the evaluated translated messages 540 is an acceptable machine translation in the second language in accordance with the values and criteria of the product translation service profile 518. In some embodiments of the present invention, the translation evaluator 512 identifies the best translation based as least in part on the first similarity scores that are generated by the similarity analyzer 510 and/or by the second similarity scores that are generated by the translation evaluator 512. In some embodiments of the present invention, the first and second similarity scores are added up to a total score, average score, or weighted mean score and then used at 542 to identify a best translation from the evaluated translated messages 540.

In some embodiments, a binary check is made to determine whether a given translated message of the evaluated translated messages 540 meets an explicit requirement of the CWTUG 534 and/or the PTCR 536. For example, in some embodiments of the present invention, the CTKMD 502 is configured to check whether a translated message of the evaluated translated messages 540 is grammatically recited the present tense. If the check identifies that present tense is being used (as opposed the future tense or others), then the CTKMD 502 accepts the translated message. In another example, in some embodiments of the present invention, the CTKMD 502 is configured to check whether a translated message of the evaluated translated messages 540 is recited in an active voice. If the check identifies that present active voice is being used (as opposed the passive tense, or others), then the CTKMD 502 accepts the translated message.

In some embodiments of the present invention, if the CTMKD 502 is able to identify the best translation from the evaluated translated messages 540, the best translation is outputted by the CTKMD 502 and transmitted to the IDE 504. In some embodiments of the present invention, if the CTMKD 502 is unable to identify the best translation from the evaluated translated messages 540, the RTTES adjustment handler 514 instructs the RTTES administrator at 517 to re-configure, via machine learning, the weights assigned to the set of translation evaluation criteria 524 in the product translation service profile 518 to update the product translation profile 518 such that the RTTES service provided by the CTKMD 502 is improved in its ability to identify the best translation in subsequent input texts that are received by the CTKMD 502. Similarly, in some embodiments of the present invention, if the CTMKD 502 is unable to identify the best translation from the evaluated translated messages 540, the RTTES adjustment handler 514 additionally or alternatively instructs the MT customizer 520 to re-configure, via machine learning, one or more machine translation settings of the MMTS 522 based at least in part on the evaluation scores (e.g., the first and second similarity scores as generated by the similarity analyzer 510 and the translation valuator 512) and/or on the updated production translation service profiles 518.

In regards to the IDE 504, the IDE 504 of example system 500 includes a translated message repository 532, an RTTES GUI 544, a service profile file 546, a user profile file 548, and a source message repository 550 comprising a set of source messages (e.g., text input) that are to be translated. The RTTES GUI 544 is configured to assist in causing an RTTES request 552 to be transmitted from the IDE 504 to CTKMD 502, in which the RTTES request 552 includes an input text (e.g., a message from the source message repository 550) in a first language and related parameters, such as what second language to translate the input text into. The CTKMD 502 then responds in certain embodiments by providing a suitable best translation which is then saved by IDE 504 at 560 into the translated message repository 532.

The following illustrates a non-limiting example of a pseudocode format that can be utilized by the IDE 504 to transmit the RTTES request 552 to the CTKMD: WChar*RTTES_Requester (request_ID, 1stLang, 2ndLang, InputString1, OutputstringList, PreviousFeedbackData(requestID)). For example, RTTES_Requester (req123456, English, Japanese, "The quick brown fox jumps over the lazy dog.", OutputstringList, PreviousFeedbackData (req123455, "accepted $2^{nd}$")).

In some embodiments of the present invention, the RTTES GUI 544 is configured to determine at 554 whether a translation agent 556 has requested that a translation for a given source message be obtained, and then loads the source message and related parameters at 558 and transmits the RTTES request 552 upon determining that the translation agent 556 has requested that the translation for the given input text be obtained. The determination at 554 may be made in response to the RTTES GUI 544 receiving an interactive input from the translation agent 556 via a computer that is executing the IDE 504. The interactive input can include for example, the clicking of a button on a screen of the RTTES GUI 544, or by other kinds or manners of user input that is indicative of an intention of the translation agent 556 to have a translation of a given source text be obtained (e.g., speech recognition input, touch screen sensory input, etc.).

In some embodiment of the present invention, the RTTES GUI 544 is configured to load a source message and related parameters at 558 and transmit the RTTES request 552 irrespective of whether the translation agent 556 has submitted a request via the RTTES GUI 554 for a translation. For example, in some embodiments of the present invention, the RTTES GUI 544 utilized preconfigured set of rules that establish that the RTTES request 552 is to be transmitted at a particular time or when an occurrence of a predetermined event has been detected.

In some embodiments of the present invention, the RTTES GUI 544 is further configured to allow a user, such as the translation agent 556, to manage and/or configure the service profile file 546, the user profile file 548, and/or other options such as default language options, default encoding options, and/or default service options. In some embodiments of the present invention, the service profile file 546 comprises a real-time machine translation service profile for defining and/or storing customized RTTES evaluation rules and the related parameters, such as for example, the number of targeted languages that are used for different applications, maximum buffer size, and/or other RTTES rules and related parameters. In some embodiments of the present invention, the user profile file 548 comprises one or more a user and/or product characterize files for defining and/or storing user defined customization rules that are used to customize the RTTS service that is provided via the CTKMD 502. In some embodiments of the present invention, the user profile file 518 may define a set of parameters to be used when executing machine translation (e.g., the related parameters). In some embodiments, the set of parameters includes one or more of a primary message language, a default encoding on input, a default encoding on output, a format of the primary messages, input file name extensions, output formats, file name extensions, and/or other suitable RTTS user customized parameters.

In some embodiments of the present invention, RTTES GUI 554 allows for feedback to be obtained from the translation agent 556 in order to provide an alternative and/or additional manner of improving the way in which the CTKMD 502 identifies the best translation from the evaluated translated messages 540. For example, in some embodiments of the present invention, CTKMD 502 is further or alternatively configured to identify the best translation by identifying a subset of potential best translation candidates that are each associated with a rank score. CTKMD 502 then receives an input from a user via RTTES GUI 544 as to a selection of a best translation from the subset of potential best translation candidates. Upon the selected best translation not being the highest ranked translation, or not being within n-number of highest ranked translations, as established by the CTKMD 502 from the subset of potential best translation candidates, the RTTES adjustment handler 514 is then executed, in which RTTES adjustment handler 514 is configured, as noted above, to update the product translation service profile 518 based at least in part on the performed evaluation. For example, if a first translation is ranked 1, a second translation is ranked 2, and a third translation is ranked 3, and if the user input selects the second or third translation as opposed to the first translation, the RTTES adjustment handler 514 would then be executed in some embodiments of the present invention.

In some embodiments of the present invention system 500 includes an encoding detector 562 for detecting an encoding of a given string (e.g. a source message), and/or includes a language detector 564 for detecting a language of the given string. Source messages that are in the same language may be encoded in different encoding schemes. For example, in some embodiments of the present invention, different platforms may use different default encodings for the translation of messages, in which the respective encoding is based on a respective user group. For example, a Japanese user may seek to use the encoding IBMeucJP, IBM-943, UTF-8, or others as a primary encoding for a given translated message. In some embodiments of the present invention, if the RTTES request 552 is detected at 566 as including text input of an encoding scheme that is unknown to RTTES API 506, then encoding information is obtained at 568 and encoding information is transmitted to the encoding detector 562 for further processing. If the RTTES request 552 is detected at 566 as including text input of an encoding scheme that is known to the RTTES API 506, then a determination is made at 570 as to whether the input text is in a language that is known to the RTTES API 506. If the input text is detected at 570 as being in a known language, then the RTTES request 552 is forwarded to the CTKMD 502 via the RTTES API 506. If the input text is detected at 570 is detected as being in an unknown known language, then the input text is transmitted to the language detector 564 for further processing. After the language detector 564 identifies the language of the input text, the RTTES request 552 is forwarded to the CTKMD 502 via the RTTES API 506.

Figure 6:
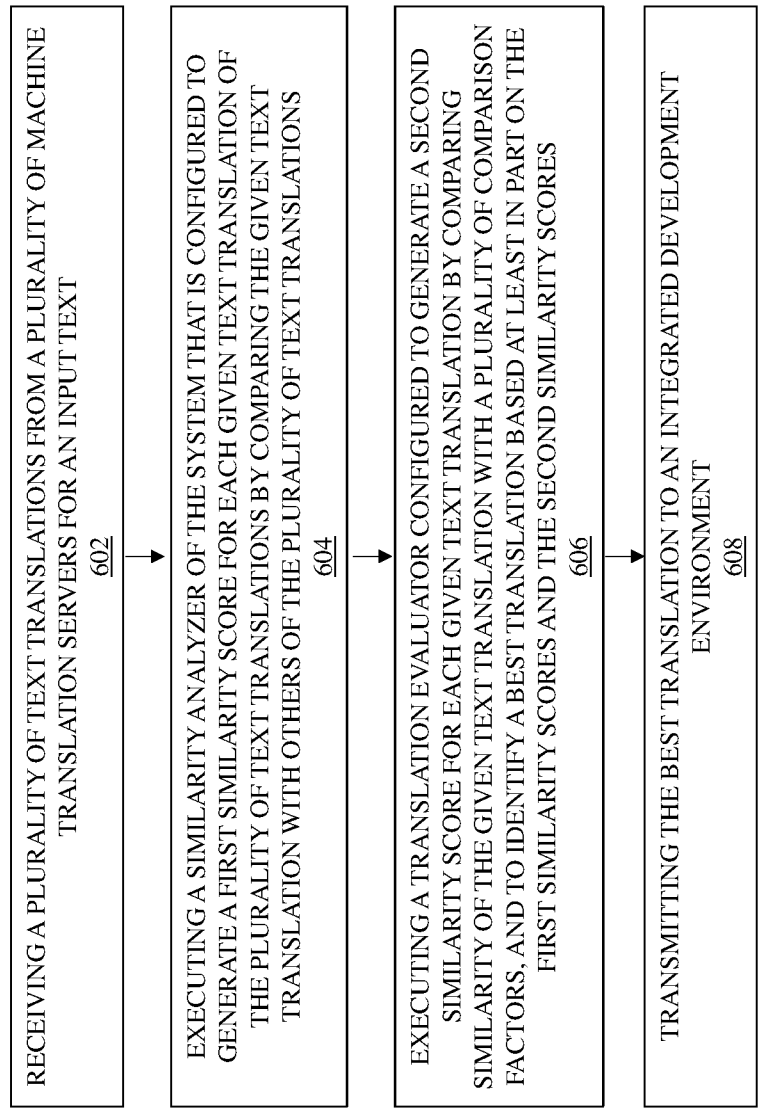
FIG. 6 depicts a flow diagram illustrating a methodology in accordance with one or more embodiments of the present invention.

Additional details of the operation of systems 400 and systems 500 will now be described with reference to FIG. 6, wherein FIG. 6 depicts a flow diagram illustrating a methodology 600 according to one or more embodiments of the present invention. At 602, a plurality of text translations from a plurality of machine translation services are received for an input text. At 604, a similarity analyzer is executed that is configured to generate a first similarity score for each given text translation of the plurality of text translations by comparing the given text translation with the other received text translations of the plurality of text translations. At 606, a translation evaluator is executed that is configured to generate a second similarity score for each given text translation by comparing similarity of the given text translation with a plurality of comparison factors, and configured to identify a best translation based at least in part on the first similarity scores and the second similarity scores. At 608, the best translation is transmitted to an integrated development environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of real-time translation evaluation service comprising:
  receiving, by a system comprising one or more processors, a translation request from an integrated development environment via a real-time translation evaluation service API, wherein the translation request includes an input text in a first language;
  generating, by the system, a plurality of text translations of the input text, wherein the generating of the plurality of translations includes translating, by a plurality of machine translation servers of the system, the input text from the first language into a second language, wherein each of the plurality of text translations is generated by a different machine translation server of the plurality of machine translation servers of the system;
  executing, by the system, a similarity analyzer of the system that is configured to generate a first similarity score for each given text translation of the plurality of text translations by comparing the given text translation with others of the plurality of text translations;
  executing, by the system, a translation evaluator of the system that is configured to generate a second similarity score for each given text translation by comparing similarity of the given text translation with a plurality of comparison factors, and to identify a best translation based at least in part on the first similarity scores and the second similarity scores, wherein the comparison factors include company word/term usage guidelines (CWTUGs) and product translation consistency rules (PTCRs), wherein the CWTUGs include a set of words in the first language that are predetermined to remain untranslated, wherein the PTCRs are defined for a given product to establish a set of translation rules associated with the given product; and
  responding to the translation request by transmitting, by the system the identified best translation to the integrated development environment via the real-time translation evaluation service API.

2. The computer-implemented method of claim 1, wherein generating the first similarity score of each given text translation further includes comparing, by the system, a similarity between the given text translation and one or more previously accepted translated messages.

3. The computer-implemented method of claim 1, wherein generating the second similarity score of each given text translation further includes comparing, by the system, the given text translation with a plurality of user defined customization rules.

4. The computer-implemented method of claim 1, wherein the integrated development environment includes a user profile file and a service profile file, wherein the user profile file includes the plurality of user defined customization rules, and wherein the service profile file includes customized real-time translation evaluation rules and related parameters.

5. The computer-implemented method of claim 1, wherein the system includes a product translation service file comprising a set of translation evaluation criteria, wherein the set of translation evaluation criteria includes respective weights for the CWTUGs and the PTCRs.

6. The computer-implemented method of claim 5, wherein identifying the best translation further includes identifying a subset of potential best translation candidates that are each associated with a rank score, wherein the method further includes:
   receiving, by the system, an input from a user as to a selection of a best translation from the subset of potential best translation candidates; and
   upon the selected best translation not being the highest ranked translation from the subset of potential best translation candidates, executing, by the system, a real-time translation evaluation service adjustment handler of the system that is configured to update the product translation service file based at least in part on a performed evaluation.

7. A system for real-time translation evaluation service, the system comprising one or more processors configured to perform a method comprising:
   receiving, by the system, a translation request from an integrated development environment via a real-time translation evaluation service API, wherein the translation request includes an input text in a first language;
   generating, by the system, a plurality of text translations of the input text, wherein the generating of the plurality of translations includes translating, by a plurality of machine translation servers of the system, the input text from the first language into a second language, wherein each of the plurality of text translations is generated by a different machine translation server of the plurality of machine translation servers of the system;
   executing, by the system, a similarity analyzer of the system that is configured to generate a first similarity score for each given text translation of the plurality of text translations by comparing the given text translation with others of the plurality of text translations;
   executing, by the system, a translation evaluator of the system that is configured to generate a second similarity score for each given text translation by comparing similarity of the given text translation with a plurality of comparison factors, and to identify a best translation based at least in part on the first similarity scores and the second similarity scores, wherein the comparison factors include company word/term usage guidelines (CWTUGs) and product translation consistency rules (PTCRs), wherein the CWTUGs include a set of words in the first language that are predetermined to remain untranslated, wherein the PTCRs are defined for a given product to establish a set of translation rules associated with the given product; and
   responding to the translation request by transmitting, by the system the identified best translation to the integrated development environment via the real-time translation evaluation service API.

8. The system of claim 7, wherein generating the first similarity score of each given text translation further includes comparing, by the system, a similarity between the given text translation and one or more previously accepted translated messages.

9. The system of claim 7, wherein generating the second similarity score of each given text translation further includes comparing, by the system, the given text translation with a plurality of user defined customization rules.

10. The system of claim 7, wherein the integrated development environment includes a user profile file and a service profile file, wherein the user profile file includes the plurality of user defined customization rules, and wherein the service profile file includes customized real-time translation evaluation rules and related parameters.

11. The system of claim 7, wherein the system includes a product translation service file comprising a set of translation evaluation criteria, wherein the set of translation evaluation criteria includes respective weights for the CWTUG and the PTCRs.

12. The system of claim 11, wherein identifying the best translation further includes identifying a subset of potential best translation candidates that are each associated with a rank score, wherein the method further includes:
   receiving, by the system, an input from a user as to a selection of a best translation from the subset of potential best translation candidates; and
   upon the selected best translation not being the highest ranked translation from the subset of potential best translation candidates, executing, by the system, a real-time translation evaluation service adjustment handler of the system that is configured to update the product translation service file based at least in part on a performed evaluation.

13. A computer program product for real-time translation evaluation service, the computer program product comprising a computer readable storage medium having program instructions embodied therewith, wherein the computer readable storage medium is not a transitory signal per se, the program instructions executable by a system operatively coupled to one or more processors to cause the system to perform a method comprising:
   receiving, by the system, a translation request from an integrated development environment via a real-time translation evaluation service API, wherein the translation request includes an input text in a first language;
   generating, by the system, a plurality of text translations of the input text, wherein the generating of the plurality of translations includes translating, by a plurality of machine translation servers of the system, the input text from the first language into a second language, wherein each of the plurality of text translations is generated by a different machine translation server of the plurality of machine translation servers of the system;
   executing, by the system, a similarity analyzer of the system that is configured to generate a first similarity score for each given text translation of the plurality of text translations by comparing the given text translation with others of the plurality of text translations;
   executing, by the system, a translation evaluator of the system that is configured to generate a second similarity score for each given text translation by comparing similarity of the given text translation with a plurality of comparison factors, and to identify a best translation based at least in part on the first similarity scores and the second similarity scores, wherein the comparison factors include company word/term usage guidelines (CWTUGs) and product translation consistency rules (PTCRs), wherein the CWTUGs include a set of words in the first language that are predetermined to remain untranslated, wherein the PTCRs are defined for a given product to establish a set of translation rules associated with the given product; and
   responding to the translation request by transmitting, by the system the identified best translation to the integrated development environment via the real-time translation evaluation service API.

14. The computer program product of claim 13, wherein generating the first similarity score of each given text translation further includes comparing, by the system, a similarity between the given text translation and one or more previously accepted translated messages.

15. The computer program product of claim 13, wherein the integrated development environment includes a user profile file and a service profile file, wherein the user profile file includes a plurality of user defined customization rules, and wherein the service profile file includes customized real-time translation evaluation rules and related parameters.

16. The computer program product of claim 13, wherein the system includes a product translation service file comprising a set of translation evaluation criteria, wherein the set of translation evaluation criteria includes respective weights for the CWTUGs and the PTCRs.

17. The computer program product of claim 16, wherein identifying the best translation further includes identifying a subset of potential best translation candidates that are each associated with a rank score, wherein the method further includes:
- receiving, by the system, an input from a user as to a selection of a best translation from the subset of potential best translation candidates; and
- upon the selected best translation not being the highest ranked translation from the subset of potential best translation candidates, executing, by the system, a real-time translation evaluation service adjustment handler of the system that is configured to update the product translation service file based at least in part on a performed evaluation.

* * * * *